United States Patent
Rule et al.

(10) Patent No.: US 6,762,275 B1
(45) Date of Patent: Jul. 13, 2004

(54) METHOD TO DECREASE THE ACETALDEHYDE CONTENT OF MELT-PROCESSED POLYESTERS

(75) Inventors: Mark Rule, Atlanta, GA (US); Yu Shi, Alpharetta, GA (US)

(73) Assignee: The Coca-Cola Company, Atlanta, GA (US)

( * ) Notice: Subject to any disclaimer, the term of this patent is extended or adjusted under 35 U.S.C. 154(b) by 0 days.

(21) Appl. No.: 10/446,094

(22) Filed: May 27, 2003

(51) Int. Cl.[7] ............................................. C08G 63/02
(52) U.S. Cl. ............... 528/271; 264/176.1; 264/219; 264/328.1; 264/330; 428/36.92; 428/34.7; 428/35.7; 525/437; 528/193; 528/194; 528/272
(58) Field of Search ........................ 264/176.1, 219, 264/328.1, 330; 428/36.92, 34.7, 35.7; 525/437; 528/193, 194, 271, 272

(56) References Cited

U.S. PATENT DOCUMENTS

| | | | |
|---|---|---|---|
| 3,926,736 A | 12/1975 | Bucolo ..................... 195/103.5 |
| 3,956,324 A | 5/1976 | Jost ............................ 260/368 |
| 4,327,137 A | 4/1982 | Sawa et al. ..................... 428/35 |
| 4,340,453 A | 7/1982 | Noomem ............... 204/159.15 |
| 4,368,286 A | 1/1983 | Hayashi et al. .............. 524/394 |
| 4,552,791 A | 11/1985 | Hahn .......................... 428/35 |
| 4,609,721 A | 9/1986 | Kirshenbaum et al. ..... 528/285 |
| 4,837,115 A | 6/1989 | Igarashi et al. .......... 428/36.92 |
| 4,840,981 A | 6/1989 | Hasuo et al. ................ 524/114 |
| 4,886,847 A | 12/1989 | Bastioli et al. ................ 524/84 |
| 4,894,404 A | 1/1990 | Minnick ..................... 524/226 |
| 5,084,356 A | 1/1992 | Deak et al. ................. 428/458 |
| 5,085,904 A | 2/1992 | Deak et al. ................ 428/35.7 |
| 5,102,943 A | 4/1992 | Logullo ...................... 524/487 |
| 5,112,741 A | 5/1992 | Palmer et al. ................ 435/25 |
| 5,258,233 A | 11/1993 | Mills et al. ................. 428/480 |
| 5,266,416 A | 11/1993 | Inoue et al. ................ 428/651 |
| 5,298,550 A | 3/1994 | Riccardi et al. ............ 524/394 |
| 5,340,884 A | 8/1994 | Mills et al. ................. 125/420 |
| 5,364,666 A | 11/1994 | Williams et al. ............ 427/579 |
| 5,378,510 A | 1/1995 | Thomas et al. ............. 427/563 |
| 5,389,710 A | 2/1995 | Dege et al. ................. 524/243 |
| 5,405,921 A | 4/1995 | Muschiatti et al. ......... 525/444 |
| 5,462,779 A | 10/1995 | Misiano et al. ............. 428/347 |
| 5,468,520 A | 11/1995 | Williams et al. ............ 427/532 |
| 5,510,155 A | 4/1996 | Williams et al. ............ 427/532 |
| 5,531,060 A | 7/1996 | Fayet et al. .................... 53/426 |
| 5,587,191 A | 12/1996 | Donsbach et al. ............ 426/66 |
| 5,597,891 A | 1/1997 | Nelson et al. ............... 528/481 |
| 5,616,369 A | 4/1997 | Williams et al. ............ 427/536 |
| 5,648,032 A | 7/1997 | Nelson et al. ............... 264/101 |
| 5,650,469 A | 7/1997 | Long et al. ................. 525/425 |
| 5,656,221 A | 8/1997 | Schumann et al. ........... 264/85 |
| 5,656,719 A | 8/1997 | Stibal et al. ................. 528/491 |
| 5,658,628 A | 8/1997 | Ishii et al. ............... 428/36.92 |
| 5,663,223 A | 9/1997 | Teumac et al. ............. 524/109 |
| 5,670,224 A | 9/1997 | Izu et al. .................... 428/35.8 |
| 5,691,007 A | 11/1997 | Montgomery ............... 427/576 |
| 5,704,983 A | 1/1998 | Thomas et al. ............. 118/723 |
| 5,837,800 A | 11/1998 | Suzuki et al. ............... 528/193 |
| 5,856,385 A | 1/1999 | Mehrer et al. .............. 524/108 |
| 5,874,517 A | 2/1999 | Huang et al. ............... 528/271 |
| 5,898,058 A | 4/1999 | Nichols et al. ............. 528/286 |
| 5,922,828 A | 7/1999 | Schiraldi .................... 528/279 |
| 5,985,389 A | 11/1999 | Dalton et al. .............. 428/35.7 |
| 6,099,778 A | 8/2000 | Nelson et al. ........... 264/176.1 |
| 6,160,085 A | 12/2000 | Fujimori et al. ............. 528/272 |
| 6,191,209 B1 | 2/2001 | Andrews et al. ............ 524/502 |
| 6,228,447 B1 | 5/2001 | Suzuki et al. ............. 428/35.7 |
| 6,258,925 B1 | 7/2001 | Dowling et al. ............ 528/279 |
| 6,274,212 B1 * | 8/2001 | Rule et al. ............... 428/36.92 |
| 2002/0032300 A1 | 3/2002 | Dowling et al. ............ 528/272 |

FOREIGN PATENT DOCUMENTS

| | | |
|---|---|---|
| EP | 0460796 A2 | 12/1991 |
| EP | 0488605 | 6/1992 |
| EP | 0 545 442 A1 | 12/1992 |
| EP | 0 801 102 A2 | 4/1997 |
| JP | 09003179 A | 1/1997 |
| JP | 09003182 A | 1/1997 |
| WO | WO96/04833 | 2/1996 |
| WO | WO 96/35740 | 11/1996 |
| WO | WO97/2126 A | 1/1997 |
| WO | WO97/28218 | 8/1997 |
| WO | WO97/31968 A | 9/1997 |
| WO | WO 98/18848 | 5/1998 |
| WO | WO 00/66659 | 4/2000 |
| WO | WO 01/02489 A1 | 1/2001 |
| WO | WO01/62838 | 8/2001 |

* cited by examiner

*Primary Examiner*—Terressa Boykin
(74) *Attorney, Agent, or Firm*—Sutherland Asbill & Brennan LLP

(57) ABSTRACT

A method for decreasing acetaldehyde content of melt processed polyester comprising combining with polyester an organic additive compound that scavenges acetaldehyde from polyester. The organic additive compound comprises at least two component molecular fragments, each component molecular fragment comprising at least two hydrogen substituted heteroatoms bonded to carbons of the respective component molecular fragment. Each component molecular fragment is reactive with acetaldehyde in the polyester to form water and a resulting organic compound comprising an unbridged five or six member ring including the at least two heteroatoms. The reduced acetaldehyde content polyester is particularly useful for making containers such as for packaging beverages.

26 Claims, 1 Drawing Sheet

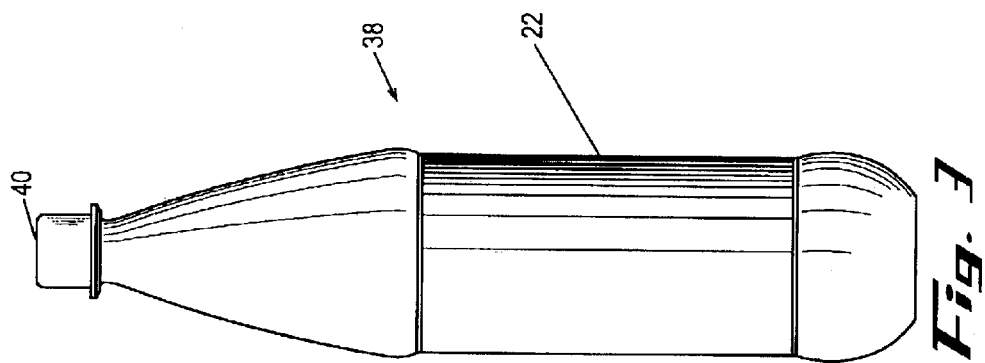
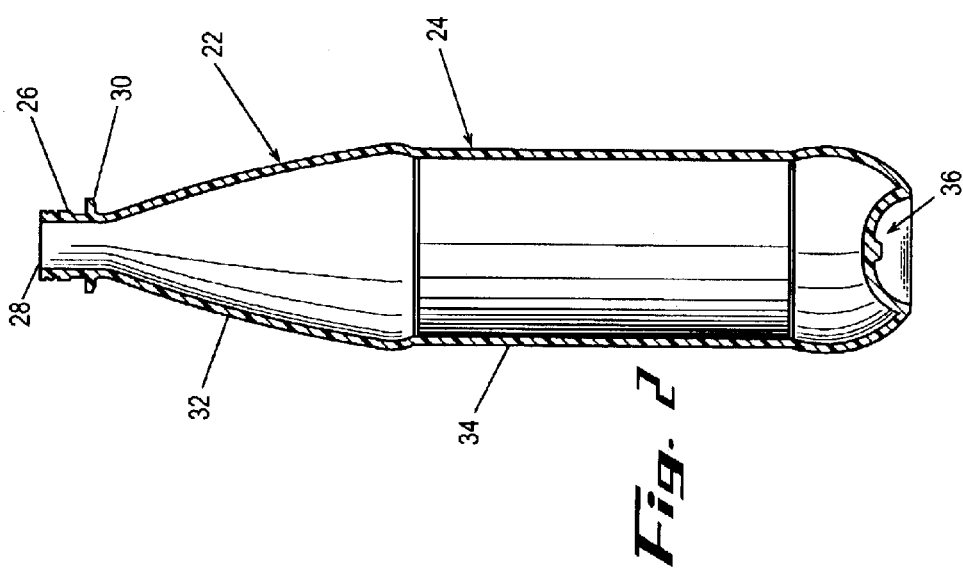
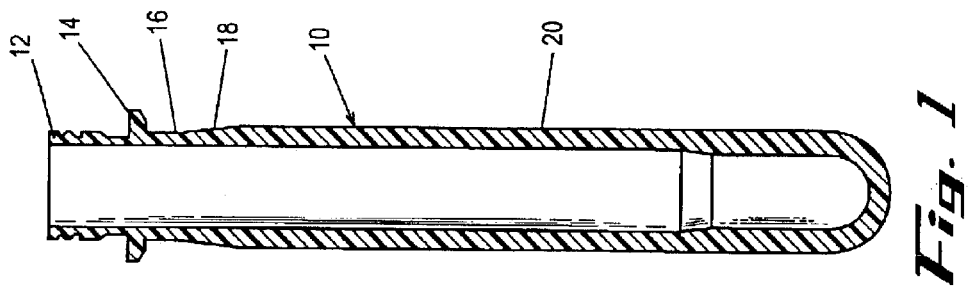

METHOD TO DECREASE THE ACETALDEHYDE CONTENT OF MELT-PROCESSED POLYESTERS

FIELD OF INVENTION

The present invention relates to polyester products such as poly(ethylene terephthalate) containers. More particularly, this invention relates to reduction of acetaldehyde content of melt-processed polyesters by incorporation of additives capable of reacting with acetaldehyde.

BACKGROUND OF THE INVENTION

Polyesters, especially poly(ethylene terephthalate) (PET) are versatile polymers that enjoy wide applicability as fibers, films, and three-dimensional structures. A particularly important application for PET is for containers, especially for food and beverages. This application has seen enormous growth over the last 20 years, and continues to enjoy increasing popularity. Despite this growth, PET has some fundamental limitations that restrict its applicability. One such limitation is its tendency to generate acetaldehyde (AA) when it is melt processed. Because AA is a small molecule, AA generated during melt processing can migrate through the PET. When PET is processed into a container, AA will migrate over time to the interior of the container. Although AA is a naturally occurring flavorant in a number of beverages and food products, for many products, the taste imparted by AA is considered undesirable. For instance, AA will impart a fruity flavor to water, which detracts from the clean taste desired for this product.

PET is traditionally produced by the transesterification or esterification/polymerization of a terephthalate precursor (either dimethyl terephthalate or terephthalic acid) and ethylene glycol. If the end use application for the melt-polymerized PET is for food packaging, the PET is then subjected to a second operation known as solid-state polymerization (SSP), whereby the molecular weight is increased and the AA generated during melt processing is removed. A widely used method to convert the solid-state polymerized PET into containers consists of drying and remelting the PET, injection molding the polymer into a container preform, and subsequently stretch blow-molding the preform into the final container shape. It is during the remelting of the PET to fashion the container preforms that AA is regenerated. Typical preform AA levels for PET processed in this manner using the most modern injection molding equipment is 6–8 $\mu$g/g (ppm).

Historically, the impact of AA on product taste has been minimized by careful control of the melt processing conditions used to make containers or preforms, and by use of special processing conditions in polymer preparation. This approach is successful for most packages, where the taste threshold for AA is sufficiently high, or where the useful life of the container is sufficiently short. However, obtaining low preform AA carries with it a significant cost. That cost includes the need to carry out a separate processing step after the melt polymerization of PET (solid-state polymerization), the need for specially designed injection molding equipment, and the need to continually monitor the preform AA content during container production. For other applications, where the desired shelf-life of the container is longer, the product is more sensitive to off-taste from AA, or the prevailing environmental conditions are warmer, it is not possible to keep the beverage AA level below the taste threshold by using these methods. For example, in water the taste threshold is considered to be less than about 40 $\mu$g/L (ppb), and often a shelf-life of up to two years is desired. For a PET bottle that contains about 600 ml of beverage, a preform AA content of 8 ppm can result in a beverage AA level greater than 40 ppb in as little as one month.

In addition to careful control of melt-processing conditions for PET, prior art methods include modifications to the PET itself via use of lower intrinsic viscosity (IV) resins and/or the use of lower melting PET resins. However, each of these resin modification approaches has been only partially successful, and they suffer from their own limitations. For example, lower IV resins produce containers that are less resistant to environmental factors such as stress crack failure. Lower melting resins are achieved by increasing the copolymer content of the PET resin. However, increasing the copolymer content of the resin also increases the stretch ratio of the PET, which translates into decreased productivity in injection molding and blow molding.

Another prior art approach has been to incorporate additives into PET that will selectively react with, or scavenge, the AA that is generated. Thus, Igarashi (U.S. Pat. No. 4,837,115) discloses the use of amine-group terminated polyamides and amine-group containing small molecules. Igarashi teaches that the amine groups are effective because they can react with AA to form imines, where the amine nitrogen replaces the oxygen in the AA carbonyl group. Igarashi teaches that essentially any amine is effective. Mills (U.S. Pat. Nos. 5,258,233; 5,650,469; and 5,340,884) and Long (U.S. Pat. No. 5,266,416) claim the use of various polyamides, especially low molecular weight polyamides. Turner and Nicely (WO 97/28218) claim the use of polyesteramides. These polyamides and polyesteramides are believed to react with AA in the same manner as described by Igarashi.

While these AA scavengers are effective at reducing the AA content of melt-processed PET, they also suffer from drawbacks. In particular, relatively high loadings of the polyamides are needed to effect significant AA reductions, and a very significant yellowing of the PET occurs on incorporation of these amine-containing additives. This color formation is believed to be due to the color of the imine group itself, and is thus unavoidable. The yellow color formation inherently limits this approach to articles where the PET can be tinted to mask the color. Unfortunately, most PET articles in use today are clear and uncolored.

Another prior art approach of AA scavenger as disclosed in U.S. Pat. No. 6,274,212 uses a thermally stable organic additive, which upon reaction with AA forms an unbridged 5 or 6 member ring structure and water. As there is no inherent color formation resulting from the unbridged 5 or 6 member ring structure, the AA scavengers of this invention have much better color as compared to the above amide or amine based additives. The organic additives disclosed in the patent possess at least two hydrogen substituted heteroatoms bonded to carbons of the organic additive compound and are reactive with acetaldehyde in the polyester to form water and a resulting organic compound comprising an unbridged 5 or 6 member ring which includes the at least two heteroatoms. These additives are very effective in sequestering AA. However, due to the relatively high vapor pressure of the preferred additives, such as anthranilamide, there is some loss of the scavenger in the injection molding process due to vaporization. This relatively high vapor pressure can also lead to mold deposits in the preform forming process, which results in the need for more frequent mold cleaning and maintenance. For the same reason, the incorporation of the additive into PET masterbatches is relatively ineffective, since the additive tends to be lost from the PET during drying.

Another potential issue with the proffered additives in the patent disclosure is their ability to migrate. The preferred molecules are of relatively low molecular weight, which tend to have higher extraction rates than desired. Therefore, although these AA scavengers have be used successfully in decreasing the preform and beverage AA content on molding solid state polymerized resins, they are less applicable if the starting AA level is much higher and much higher loadings of AA scavengers are needed. Such is the case when a preform is formed from a PET melt directly from melt-phase polymerization, without intermediate pelletization and solid state polymerization.

Therefore, although the small molecule AA scavengers as covered by U.S. Pat. No. 6,274,212 are effective, there is a need for improved AA scavengers.

SUMMARY OF THE INVENTION

This invention addresses the above described need by providing a method for decreasing the acetaldehyde content of melt processed polyester comprising combining at least one organic additive compound with polyester. The organic additive compounds of the present invention comprise at least two component molecular fragments, each component molecular fragment comprising at least two hydrogen substituted heteroatoms bonded to carbons of the respective component molecular fragment. The component molecular fragments of the organic additive compound are each reactive with acetaldehyde in the polyester to form water and a resulting organic molecular fragment comprising an unbridged five or six member ring including the at least two heteroatoms. The resulting organic fragments do not impart an off-taste to beverages packaged in containers made with this treated polyester, and do not significantly discolor the polyester. Combining these organic additive compounds with the polyester require no special equipment or processing steps, and the organic additive compounds are substantially thermally stable at the melt processing temperature of the polyester.

The organic additive compounds have at least twice the molecular weight of the component molecular fragments alone and, as a result, are much less extractable from polyester, and can therefore be used at higher loadings. Furthermore, since the organic additive compounds can be used at higher loadings, the additive compounds can be used to decrease the AA content of melt-phase PET resin to acceptable levels, thus enabling the practice of direct performing, without the need for an intermediate solid-state polymerization step.

In addition, the organic additive compounds described above have a markedly lower vapor pressure than the corresponding component molecular fragments, and therefore vaporize much less readily. For this reason, they do not plate out on tooling and molds during the formation of polyester articles. The low vapor pressure and high thermal stability also enable the additive compounds to be incorporated in polyester resin and retain their activity through solid-state polymerization and subsequent drying. Because of the thermal stability and low volatility of the additives of the present invention, the point at which they are added to polyesters are not particularly critical. Thus, to reduce the AA content of preforms made from solid-state polymerized PET, the organic additive compounds can be added at the end of the melt-polymerization step, as a masterbatch to the SSP resin prior to drying, or at the point of remelting the SSP resin immediately prior to injection molding.

The polyester can be combined with the organic additive compound at different stages of polyester processing. In one embodiment, the polyester can be combined with the organic additive compound by preparing a polyester melt and combining the additive compound with the polyester melt. The additive compound can be added to the polyester prior to the melt-processing or after the melt-processing. In one embodiment, the polyester melt is not solidified prior to forming a polyester article.

This invention also encompasses compositions for use in making polyester articles with decreased acetaldehyde content comprising polyester and the above described organic additive compounds, polyester articles made with the organic additive compounds described above, and a corresponding method for making polyester articles.

Furthermore, this invention encompasses containers and container preforms made with the above described composition and packaged beverages comprising a beverage disposed in such a container.

BRIEF DESCRIPTION OF DRAWINGS

FIG. 1 is a sectional elevation view of an injection molded container preform made in accordance with a preferred embodiment of this invention.

FIG. 2 is a sectional elevation view of a blow molded container made from the preform of FIG. 1 in accordance with a preferred embodiment of this invention.

FIG. 3 is a perspective view of a packaged beverage made in accordance with a preferred embodiment of this invention.

DETAILED DESCRIPTION OF EMBODIMENTS OF THE INVENTION

As summarized above, the present invention relates to a method for substantially decreasing the acetaldehyde (AA) content of melt-processed polyesters, especially PET, by combining low levels of an organic additive compound with the polyester during melt processing. The organic additive compound scavenges the AA in the polyester by chemically reacting with the AA.

Suitable organic additive compounds effective in the present invention comprise at least two component molecular fragments, each component molecular fragment comprising at least two hydrogen substituted heteroatoms bonded to carbons of the respective component molecular fragment. The component molecular fragments of the compound are each reactive with acetaldehyde in the polyester to form water and a resulting organic molecular fragment comprising an unbridged five or six member ring including the at least two heteroatoms.

The organic additive compound has at least twice the molecular weight of the component molecular fragments, is thermally stable, has a markedly lower vapor pressure than the additives disclosed in U.S. Pat. No. 6,274,212, and is substantially less extractable from polyester. As a result, the organic additive compounds of this invention can be combined with polyester at high loadings and are therefore effective in direct melt perform operations to reduce acetaldehyde to acceptable levels.

The heteroatoms present in each molecular fragment capable of reacting with AA include oxygen (O), nitrogen (N), and sulfur (S). The heteroatoms of the component molecular fragments should have at least one bond to an active hydrogen (H), and in the course of condensing with AA should split off water. Preferred functional groups containing these heteroatoms include amine (NH₂ and NHR), hydroxyl (OH), carboxyl (CO₂H), amide (CONH₂ and CONHR), sulfonamide (SO₂NH₂), and thiol (SH). It is necessary for these functional groups to be sterically arranged so that on condensation with AA an unbridged 5 or 6 member ring can be formed. It is preferred that the structural arrangement allows the formation of a six member ring. It is especially preferred that heteroatoms of the organic additive are attached to a preformed ring or rings. It is most preferred that the preformed ring(s) are aromatic so that the unbridged 5 or 6-member ring of the resulting organic compound is bonded to the aromatic ring.

Suitable organic additive compounds are substantially thermally stable at the temperatures required for melt-processing the polyester. It is also preferred that the functional groups present on the organic additive are relatively unreactive toward the ester linkages present in polyesters. High thermal stability and low reactivity with ester linkages increase the amount of unreacted organic additive compound that will be available for condensation with AA, thus reducing the amount needed to achieve effective levels of AA scavenging. Compounds with decomposition temperatures greater than 270 deg C., as measured by Thermal Gravimetric Analysis (TGA), are desirable and compounds with decomposition temperatures greater than 300 deg C. are more preferred. Compounds that decompose by intramolecular elimination reactions at temperatures less than about 200 deg C. are least likely to be effective.

Examples of additives that meet the above requirements and are effective at decreasing the AA content of melt-processed polyesters include but are not limited to 1,2-bis (2-aminobenzamidoyl)ethane; 1,2-bis(2-aminobenzamidoyl)propane; 1,3-bis(2-aminobenzamidoyl)propane; 1,3-bis(2-aminobenzamidoyl)pentane; 1,5-bis(2-aminobenzamidoyl)hexane; 1,6-bis(2-aminobenzamidoyl)hexane; and 1,2-bis(2-aminobenzamidoyl)cyclohexane. Especially preferred are additive compounds where the component molecular fragments are derived from anthranilamide, because of their low cost, efficacy, and ease of incorporation into PET.

Generally, suitable organic additive compounds possess component molecular fragments that have one of the following formulas:

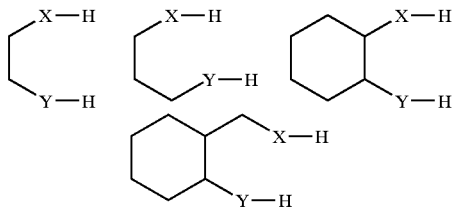

In the foregoing equations, X and Y represent functional groups including at least one active hydrogen represented by H and at least one heteroatom such as O, N, or S. The preferred component molecular fragments are those having cyclic structures preferably including an aromatic ring.

Examples of molecules that are capable of forming 5 or 6 member rings, but lack the necessary thermal stability include tetraethylenepentaamine, cysteine, asparagine, and 1,3-diaminopentane. Examples of molecules that are not capable of forming 5 or 6 member rings, and which show no efficacy at decreasing the AA content of melt-processed polyesters include methyl anthranilate, 2-amino dimethyl terephthalate, and stearylamine. It should be noted that Igarashi teaches that additives such as these will be effective in reducing the AA content of PET.

The amount of organic additive compound necessary to achieve the desired decrease in AA content is dependent on which specific additive compound is used, and the amount of reduction required. Organic additive compounds which are relatively more effective can achieve greater than 90% reduction in AA content at loadings of between 500 and 1000 ppm; but when necessary, such as in melt to preform operations, the organic additive compounds can be added in levels greater than 2000 ppm.

The organic additive compounds are most effective in reducing AA in polyesters formed from ethylene glycol and diacids or diesters of such acids. Such polyesters include poly(ethylene terephthalate), poly(ethylene naphthalate), poly(ethylene adipate), poly(ethylene isophthalate), and blends or copolymers of the same. Additional glycol linkages that may be present as comonomers include cyclohexanedimethanol, diethylene glycol, 1,2-propanediol, neopentylene glycol, 1,3-propanediol, and 1,4-butanediol.

The method of incorporation of the claimed organic additive compounds into polyesters is not critical, since the additive compounds are effective when added at any stage in the manufacture or use the polyester. The additive compounds can be dispersed in a liquid carrier and mixed with the polyester pellets immediately before injection molding. They may also be incorporated by spraying a slurry of the additive in water onto the pellets prior to drying. They may be incorporated by injection of a melt or suspension of the additive into pre-melted polyester. They may also be incorporated by making a masterbatch of the additive with PET, and then mixing the masterbatch pellets with PET pellets at the desired level before drying and injection molding.

The following equations illustrate the condensation reaction of the component molecular fragments of suitable organic additive compounds of this invention with acetaldehyde to form water and a resulting compound with an unbridged ring:

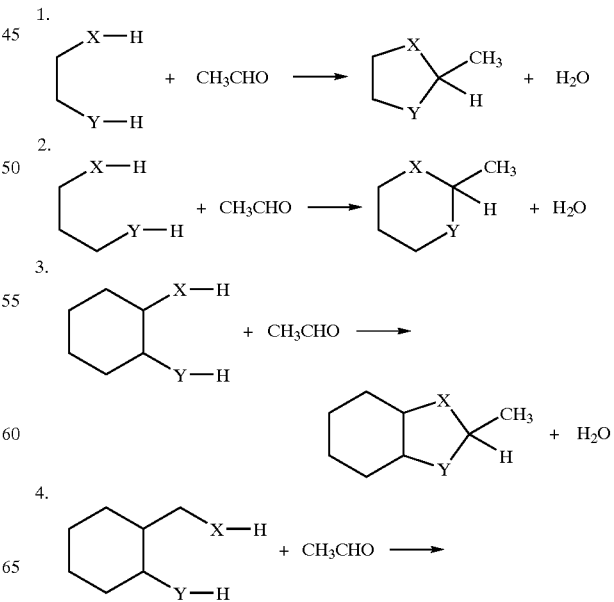

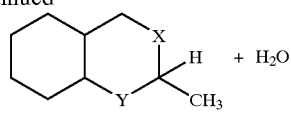

In the foregoing equations, X and Y represent functional groups including at least one active hydrogen represented by H and at least one heteroatom such as O, N, or S. If there is a preformed ring, it is preferably aromatic.

The method of eliminating acetaldehyde as disclosed in the present invention is applicable to any type of polyester-based container used to transport or store beverages. Suitable containers include, but are not limited to, bottles, drums, carafes, coolers, etc. The composition comprising polyester and the organic additive compound is particularly suitable for making containers such as a container for use in packaging beverages, because of the reduced acetaldehyde content. With the reduced acetaldehyde content, the containers impart less of an off taste to the beverages. This is particularly important for beverages such as water, which do not have a strong flavor to mask the taste and odor of acetaldehyde.

Containers can be made with the composition of the present invention using conventional methods such as injection molding and blow molding. A typical method would be to form a preform with the polyester composition and organic additive compound and then blow mold the beverage container. Examples of suitable preform and container structures and methods for making the same are disclosed in U.S. Pat. No. 5,888,598, the disclosure of which is expressly incorporated herein by reference in its entirety. The resulting containers can be used in the manufacture of package beverages according to conventional manufacturing methods.

Thus, according to one embodiment of the present invention, a bottled beverage is provided in a polyester-based container, wherein the polyester-based container comprises the above described organic additive compound. Still another embodiment of this invention is a container preform made from the polyester composition of this invention. A beverage container can then be made with the preform by conventional means. The organic additive compound can be added to the polyester during original formation of the PET or during subsequent manufacture of preforms from PET pellets. The preforms can be made by melt-processing PET pellets or by immediately melt-processing the PET during original formation or synthesis of the PET without the intermediate step of forming PET pellets or otherwise solidifying the PET prior to forming the preform. In this embodiment, it is anticipated that the polyester can be produced by melt-phase polymerization to the desired molecular weight, and is then directly transformed into the shaped article. In this embodiment, addition of the organic additive compound will occur prior to formation of the shaped article.

The present invention is useful in preventing the migration of acetaldehyde from polyester containers into any type of beverage in order to prevent off-taste of the beverage from occurring. Depending upon the type of beverage being used, the taste threshold of acetaldehyde may vary. However, it is preferred that the concentration of acetaldehyde in the beverage be decreased to approximately less than 40 ppb. More preferably, the concentration of acetaldehyde in the beverage is decreased to less than 20 ppb.

As indicated above, the present invention may be used to improve the taste of any type of beverage including, but not limited to water, colas, sodas, alcoholic beverages, juices, etc. However, it is particularly useful for preventing the off-taste of sensitive products such as water.

Turning to FIG. 1, a polyester container preform 10 is illustrated. This preform 10 is made by injection molding polyester compositions of this invention and comprises a threaded neck finish 12 which terminates at its lower end in a capping flange 14. Below the capping flange 14, there is a generally cylindrical section 16 which terminates in a section 18 of gradually increasing external diameter so as to provide for an increasing wall thickness. Below the section 18 there is an elongated body section 20.

The preform 10 illustrated in FIG. 1 can be blow molded to form a container 22 illustrated in FIG. 2. The container 22 comprises a shell 24 comprising a threaded neck finish 26 defining a mouth 28, a capping flange 30 below the threaded neck finish, a tapered section 32 extending from the capping flange, a body section 34 extending below the tapered section, and a base 36 at the bottom of the container. The container 10 is suitably used to make a packaged beverage 38, as illustrated in FIG. 3. The packaged beverage 38 includes a beverage such as a carbonated soda beverage disposed in the container 22 and a closure 40 sealing the mouth 28 of the container.

The preform 10, container 22, and packaged beverage 38 are but examples of applications using the compositions of the present invention. It should be understood that the compositions of the present invention can be used to make a variety of articles and preforms and containers having a variety of configurations.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or scope of the appended claims.

In these examples, the AA content was determined by taking three preforms representative of production after the process had reached equilibrium, grinding to pass a 2 mm screen, and desorbing the contained AA from the polyester by heating in a sealed vial at 150 deg C. for 30 minutes. The desorbed AA was then analyzed using a gas chromatograph equipped with a flame ionization detector. Beverage AA levels were determined by removing a 5 ml aliquot of the beverage, placing the aliquot into a 20 ml vial, adding 1 gram of sodium chloride, and desorbing the contained AA at 85 deg C. for 10 minutes, followed by analysis of the beverage headspace using a gas chromatograph equipped with a flame ionization detector.

The following examples illustrate the use of the organic additive compounds of this invention for decreasing the AA content of melt-processed PET. Examples 1, 9, 10, 13, 14, 16, 19, 21, and 22 are comparative examples illustrating AA level in the absence of AA scavengers of this invention or of the prior art.

In examples 1–9, 26.5 gram preforms were injection molded on a unit-cavity Arburg press. In all of these examples, an 0.84 IV PET was dried to less than about 50 ppm moisture, and formulations containing the selected additives were dispersed onto the PET. (it should be understood that use of the designation IV in all examples means intrinsic viscosity as measured by ASTM D 4603-96.) Injection molding was carried out at 280 deg C. and a 29 second cycle time. Examples 2–8 illustrate the use of additive compounds of the present invention with a solid-state polymerized PET. Example 9 illustrates the activity of anthranilamide as a scavenging agent, and shows that the additives of the present invention possess similar AA scavenging activity as anthranilamide.

TABLE 1

| Example No. | Additive Compound | ppm Additive | Preform AA content (ppm) |
|---|---|---|---|
| 1 | None | — | 16.57 |
| 2 | 1,2-bis(2-aminobenzamidoyl) ethane | 1000 | 2.08 |
| 3 | 1,6-bis(2-aminobenzamidoyl) hexane | 1000 | 1.62 |
| 4 | 1,5-bis(2-aminobenzamidoyl) hexane | 1000 | 1.58 |
| 5 | 1,3-bis(2-aminobenzamidoyl) pentane | 1000 | 2.69 |
| 6 | 1,2-bis(2-aminobenzamidoyl) propane | 1000 | 6.00 |
| 7 | 1,2-bis(2-aminobenzamidoyl) propane | 1000 | 6.36 |
| 8 | 1,3-bis(2-aminobenzamidoyl) propane | 1000 | 2.10 |
| 9 | anthranilamide | 1000 | 1.87 |

Example 10–13 illustrate the use of 1,6-bis(2-aminobenzamidoyl)hexane, an additive of the present invention, with a PET resin that had not been subjected to solid-state polymerization and that had a very high starting AA content.

TABLE 2

| Example No. | Resin | Additive Compound | ppm Additive | AA content (ppm) |
|---|---|---|---|---|
| 10 | Amorphous 0.80 IV | None | — | 58.23 |
| 11 | Amorphous 0.80 IV | 1,6-bis(2-aminobenzamidoyl) hexane | 1000 | 5.03 |
| 12 | Amorphous 0.80 IV | 1,6-bis(2-aminobenzamidoyl) hexane | 2000 | 1.45 |
| 13 | Amorphous 0.80 IV | anthranilamide | 1000 | 6.27 |

TABLE 3

| Control resin AA: 35 ppm Melt residence time | Example 14 Extrudate AA values (ppm) anthranilamide (1000 ppm) | Example 15 Extrudate AA values (ppm) 1,6-bis(2-aminobenzamidoyl) hexane (1000 ppm) |
|---|---|---|
| Std injection molding (2 min) | 11.08 | 8.42 |
| 4 min | 2.50 | 2.60 |
| 6 min | 3.60 | 2.44 |
| 10 min | 6.81 | 3.72 |
| 15 min | 71.53 | 8.34 |

In the following examples 16–19, preforms from examples 10–13, above, were blown into bottles. The bottles filled with ozonated water and were stored at 40 deg C. Samples of water were removed at the indicated times and analyzed for AA content. As can be seen from these examples, 1,6-bis(2-aminobenzamidoyl)hexane, an AA scavenger of the present invention, exhibits similar efficacy to anthranilamide in reducing beverage AA content.

TABLE 4

| Example no. | Additive | ppm Additive | Beverage AA content (ppb) | | |
|---|---|---|---|---|---|
| | | | Day 7 | Day 14 | Day 28 |
| 16 | — | — | 179 | 410 | 730 |
| 17 | 1,6-bis(2-aminobenzamidoyl)hexane | 1000 | 30 | 41 | 51 |
| 18 | 1,6-bis(2-aminobenzamidoyl)hexane | 2000 | 11 | 15 | 10 |
| 19 | anthranilamide | 1000 | 18 | 22 | 18 |

In examples 20–21, the bottles from examples 17 and 19 were filled with water containing 3% acetic acid, and were held at 70 deg C. for two hours, followed by storage at 40 deg C. Periodically, samples were removed and analyzed for the amount of scavenger that had extracted into the beverage. As can be seen from these examples, the additives of the present invention exhibit much lower extraction rates than anthranilamide, even when used at higher concentrations than those acceptable for anthranilamide.

TABLE 5

| Example no. | Additive | ppm Additive | ppb additive in beverage after storage at 40 deg C., on | | | | | | | | | |
|---|---|---|---|---|---|---|---|---|---|---|---|---|
| | | | Day 1 | Day 2 | Day 3 | Day 5 | Day 6 | Day 10 | Day 19 | Day 22 | Day 30 | Day 52 |
| 20 | 1,6-bis(2-aminobenzamidoyl)hexane | 1000 | n/a | 0.5 | n/a | 1.0 | n/a | 1.0 | 1.3 | 1.1 | 1.1 | 1.0 |
| 21 | anthranilamide | 500 | 23.5 | n/a | 27.1 | n/a | 33.2 | 33.2 | n/a | n/a | n/a | n/a | n/a = not analyzed

In examples 14 and 15, PET that had a starting AA content of 35 ppm was held as a melt at 280 deg C. in a Rheometrics melt rheometer under maximum N2 purge, for the indicated total residence time, then was quenched in water and analyzed for AA content. In example 14, the PET contained 1000 ppm of anthranilamide; in example 15 the PET contained 1000 ppm of 1,6-bis(2-aminobenzamidoyl)hexane. As can be seen from these results, the 1,6-bis(2-aminobenzamidoyl)hexane retained its efficacy for longer time than anthranilamide.

EXAMPLES 22 AND 23

In examples 22, an 0.80 IV amorphous PET resin was dried for three days at 80 deg C., and was then extruded at 280 deg C. In example 23, 1000 ppm of 1,6-bis(2-aminobenzamidoyl)hexane was added to the PET resin prior to extrusion. Both resins were extruded into pellets and then crystallized for 2 hours at the temperatures indicated in Table 6. After crystallization, the resins were dried at 177 deg C. for two hours, and were then re-extruded under the same conditions as before. The AA content of the PET containing 1000 ppm 1,6-bis(2-aminobenzamidoyl)hexane was markedly lower than the control resin, demonstrating that the AA scavenger of the present invention retains its efficacy even after prolonged exposure to high temperatures. The results showed the possibility of using 1,6 AAA dimer as a resin solution. It survived both crystallizing and drying conditions. Therefore, it can be used for the melt to preform application, where a sidestream of the line is needed when the injection molding machine is not ready or when there is excess capability of the reactor.

TABLE 6

| AA (ppm) | Example 22 0.80 IV amorphous PET | Example 23 0.80 IV amorphous PET with 1,6-bis(2-aminobenzamidoyl) hexane |
|---|---|---|
| Extrudate AA content | 21.76 ppm | 5.22 ppm |
| 1. Extrudate AA content after crystallization at 160 C. for 2 hrs | 17.38 ppm | 0.18 ppm |
| 2. Extrudate AA content after crystallization at 170 C. for 2 hrs | 16.57 ppm | 0.16 ppm |
| 3. Extrudate AA content after crystallization at 180 C. for 2 hrs | 11.19 ppm | 0.27 ppm |
| 1. re-extruded | 23.81 ppm | 4.07 ppm |
| 2. re-extruded | 26.70 ppm | 4.27 ppm |
| 3. re-extruded | 24.08 ppm | 4.11 ppm |

It should be understood that the foregoing relates to particular embodiments of the present invention, and that numerous changes may be made therein without departing from the scope of the invention as defined by the following claims.

We claim:

1. A method for decreasing acetaldehyde content of melt-processed polyester comprising combining with polyester an organic additive compound comprising at least two component molecular fragments, each component molecular fragment comprising at least two hydrogen-substituted heteroatoms bonded to carbons of the component molecular fragment, the component molecular fragments each being reactive with acetaldehyde in the polyester to form water and a resulting organic molecular fragment comprising an unbridged 5- or 6-member ring including the at least two heteroatoms.

2. The method of claim 1 wherein the heteroatoms are selected from the group of oxygen, sulfur, and nitrogen.

3. The method of claim 1 wherein at least one of the component molecular fragments includes a preformed ring.

4. The method of claim 3 wherein the preformed ring is an aromatic ring.

5. The method of claim 4 wherein the unbridged 5 or 6-member ring of the resulting organic molecular fragment is bonded to the aromatic ring.

6. The method of claim 1 wherein the two heteroatoms are both nitrogen.

7. The method of claim 1 wherein at least one of the component molecular fragments is an anthranilamide derivative.

8. The method of claim 1 wherein the additive compound is selected from the group consisting of 1,2-bis(2-aminobenzamidoyl)ethane; 1,2-bis(2 aminobenzamidoyl) propane; 1,3-bis(2 aminobenzamidoyl)propane; 1,3-bis(2-aminobenzamidoyl)pentane; 1,5-bis(2-aminobenzamidoyl)hexane; and 1,6-bis(2-aminobenzamidoyl)hexane.

9. The method of claim 1 wherein the additive compound is 1,6-bis(2-aminobenzamidoyl)hexane.

10. The method of claim 1 wherein the additive compound is the reaction product of isatoic anhydride and an amine selected from the group consisting of 1,2-diaminoethane, 1,6-diaminohexane, 1,3-diaminopropane, 1,5-diaminohexane, 1,2-diaminopropane, or 1,3-diaminopentane.

11. The method of claim 1 wherein the additive compound is combined with the polyester in an amount in the range of about 50 ppm to about 2000 ppm.

12. The method of claim 1 wherein at least one component molecular fragment of the organic additive compound comprises at least two functional groups, each of the at least two functional groups including at least one of the at least two hydrogen-substituted heteroatoms, the at least two functional groups selected from the group consisting of amine, hydroxyl, carboxyl, amide, sulfonamide, and thiol groups.

13. The method of claim 1 wherein the organic additive compound is substantially thermally stable at the melt-processing temperature of the polyester.

14. The method of claim 1 wherein the organic additive compound has a thermal decomposition temperature greater than about 270 deg C.

15. The method of claim 1 wherein the organic additive compound has a thermal decomposition temperature greater than about 300 deg C.

16. The method of claim 1 wherein the organic additive compound is substantially unreactive with the polyester.

17. The method as in claim 1, further comprising melt-processing the polyester, wherein the additive compound is added to the polyester prior to the melt-processing.

18. The method as in claim 1, further comprising melt-processing the polyester, wherein the additive compound is added to the polyester after the melt-processing.

19. A polyester article made in accordance with a method comprising:

combining with polyester an organic additive compound comprising at least two component molecular fragments, each component molecular fragment comprising at least two hydrogen-substituted heteroatoms bonded to carbons of the component molecular fragment, each component molecular fragment being reactive with acetaldehyde in the polyester to form water and a resulting organic molecular fragment comprising an unbridged 5- or 6-member ring including the at least two heteroatoms; and forming an article with the polyester.

20. A polyester article as in claim 19 wherein the article is a preform.

21. A polyester article as in claim 19 wherein the article is a container.

22. A packaged beverage comprising a beverage disposed in the container of claim 21.

23. A method for making a polyester article comprising:

combining with polyester an organic additive compound comprising at least two component molecular fragments, each component molecular fragment comprising at least two hydrogen-substituted heteroatoms bonded to carbons of the component molecular fragment, the component molecular fragments each being reactive with acetaldehyde in the polyester to form water and a resulting organic molecular fragment comprising an unbridged 5- or 6-member ring including the at least two heteroatoms; and forming an article with the polyester.

24. A method as in claim 23 wherein the article is a preform.

25. A method as in claim 23 wherein the article is a container.

26. A composition for use in making polyester items with decreased acetaldehyde content comprising polyester and an organic additive compound comprising at least two component molecular fragments, each component molecular fragment comprising at least two hydrogen-substituted heteroatoms bonded to carbons of the component molecular fragment, the component molecular fragments each being reactive with acetaldehyde in the polyester to form water and a resulting organic molecular fragment comprising an unbridged 5- or 6-member ring including the at least two heteroatoms.

* * * * *